US011350621B2

(12) United States Patent
Bauer (10) Patent No.: US 11,350,621 B2
(45) Date of Patent: Jun. 7, 2022

(54) CONTROL DEVICE FOR AN APPLICATION DEVICE AND APPLICATION DEVICE HAVING A CONTROL DEVICE

(71) Applicant: ARGO-HYTOS GROUP AG, Baar (CH)

(72) Inventor: Wolfgang Bauer, Weinheim (DE)

(73) Assignee: ARGO-HYTOS GROUP AG, Baar (CH)

( * ) Notice: Subject to any disclaimer, the term of this patent is extended or adjusted under 35 U.S.C. 154(b) by 418 days.

(21) Appl. No.: 16/614,139

(22) PCT Filed: May 23, 2017

(86) PCT No.: PCT/EP2017/062438
§ 371 (c)(1),
(2) Date: Nov. 15, 2019

(87) PCT Pub. No.: WO2018/215058
PCT Pub. Date: Nov. 29, 2018

(65) Prior Publication Data
US 2021/0307313 A1     Oct. 7, 2021

(51) Int. Cl.
*A01M 7/00* (2006.01)
*F15B 11/032* (2006.01)
*F15B 1/02* (2006.01)

(52) U.S. Cl.
CPC ........... *A01M 7/0057* (2013.01); *F15B 1/021* (2013.01); *F15B 11/032* (2013.01);
(Continued)

(58) Field of Classification Search
CPC ................ F15B 1/021; F15B 2211/625; F15B 2211/7053; F15B 2211/30525; A01M 7/0057
See application file for complete search history.

(56) References Cited

U.S. PATENT DOCUMENTS 4,288,034 A    9/1981   Widmer et al.
5,222,614 A *  6/1993   Ballu ..................... A01M 7/005
                                                            212/347
(Continued)

FOREIGN PATENT DOCUMENTS

DE    102012000045 B3 *  3/2013    .............. F15B 1/021
EP    1167095 A1    1/2002

OTHER PUBLICATIONS

International Search Report (in English and German) and Written Opinion issued in PCT/EP2017/062438, dated Mar. 2, 2018, 12 pages.

*Primary Examiner* — Thomas E Lazo
(74) *Attorney, Agent, or Firm* — Hamre, Schumann, Mueller & Larson, P.C.

(57) ABSTRACT

A control device for an agricultural application device which has an application boom pivotally mounted on a carrier, on which application components are arranged for applying liquid and/or solid active substances. The control device has a pressure supply connection and a return connection and a controllable valve arrangement and a hydraulic cylinder arrangement, which has a first cylinder effective area, connected to the valve arrangement and a second cylinder effective area, wherein the two cylinder effective areas can be pressurized and each are connected to a hydraulic accumulator, and wherein the pivot position of the application boom is variable by changing the switching state of the valve arrangement. In order to further develop the control device in such a way that the spring rate of the application boom can be decoupled from its pivot position, it is proposed according to the invention that the cylinder effective areas can be pressurized with a predeterminable pressure independent of (Continued)

the pivot position of the application boom. In addition, an agricultural application device having such a control device is proposed.

20 Claims, 5 Drawing Sheets

(52) U.S. Cl.
CPC ............ *F15B 2211/30525* (2013.01); *F15B 2211/50572* (2013.01); *F15B 2211/625* (2013.01); *F15B 2211/7053* (2013.01)

(56) References Cited

U.S. PATENT DOCUMENTS

| | | |
|---|---|---|
| 6,119,963 A | 9/2000 | Bastin et al. |
| 6,293,475 B1 | 9/2001 | Sobolik |
| 2005/0184175 A1 | 8/2005 | Wubben et al. |
| 2009/0173802 A1 | 7/2009 | Theeuwen et al. |
| 2014/0196996 A1* | 7/2014 | Ito ..................... A01M 7/0057 188/266.2 |
| 2014/0197297 A1 | 7/2014 | Ito et al. |

* cited by examiner

CONTROL DEVICE FOR AN APPLICATION DEVICE AND APPLICATION DEVICE HAVING A CONTROL DEVICE

The invention relates to a control device for an agricultural application device, which has an application boom pivotally mounted on a carrier, on which application components are arranged for applying liquid and/or solid active substances, wherein the control device has a pressure supply connection for supplying pressurized hydraulic fluid and a return connection for discharging hydraulic fluid to a storage tank, and wherein the control device has a controllable valve arrangement and a hydraulic cylinder arrangement, which has a first cylinder effective area and a second cylinder effective area, connected to the valve arrangement, wherein the cylinder effective areas are each connected to a hydraulic accumulator and can be pressurized with pressurized hydraulic fluid, and wherein the pivot position of the application boom is variable by changing the switching state of the valve arrangement.

Moreover, the invention relates to an agricultural application device having such a control device.

Agricultural application devices are known for the application of liquid and/or solid active substances, such as pesticides, fertilizers and the like on an agricultural surface to be treated, which application devices have an application boom pivotally mounted on a carrier, on which application components are arranged, for example, spray nozzles. The application boom can assume, for example, a horizontally oriented pivot position and pivot positions inclined to the horizontal in order to be able to apply the active substances in as constant a distance as possible to the surface to be treated. The surface to be treated can be, for example, a ground surface or a plant canopy. Usually, the application boom can also be moved in the vertical direction.

Control devices are used for controlling such agricultural application devices, which control devices have a pressure supply connection for supplying pressurized hydraulic fluid and a return connection for discharging the hydraulic fluid to a storage tank. The control devices further comprise a controllable valve arrangement having a plurality of switch positions and a hydraulic cylinder arrangement connected to the valve arrangement. The hydraulic cylinder arrangement has a first cylinder effective area and a second cylinder effective area. At least one of the cylinder effective areas can be pressurized with pressurized hydraulic fluid via the valve arrangement. The pivot position of the application boom can be varied by changing the switch position of the valve arrangement.

The hydraulic cylinder arrangement may include one or more hydraulic cylinders. The hydraulic cylinders each comprise a cylinder body, which is divided by a displaceable piston into two cylinder chambers. The piston has sides facing the cylinder chambers and at least one of these sides is referred to as a cylinder effective area. The hydraulic cylinder arrangement has two cylinder effective areas, each defining a cylinder chamber. The inflow of hydraulic fluid to the cylinder chambers and the outflow of hydraulic fluid from the cylinder chambers and the consequent pressurizing of the cylinder effective areas by pressurized hydraulic fluid takes place as a function of the switching state of the valve arrangement and results in a displacement of at least one piston, which in turn leads to a change of the pivot position of the application boom.

A control device of the aforementioned type is known from the document EP 1 167 095 A1. This control device has a hydraulic cylinder having a cylinder body in which a piston is displaceably mounted. A piston rod protruding from the cylinder body is held on the piston. The interior of the cylinder body is divided into a first cylinder chamber and a second cylinder chamber by the piston, wherein the surface of the piston facing the first cylinder chamber forms a first cylinder effective area and the surface of the piston facing the second cylinder chamber forms a second cylinder effective area. The two cylinder effective areas are each connected to a hydraulic accumulator, so that the piston, and with this, the two cylinder effective areas are mounted spring-loaded. One of the two cylinder chambers is connected to a proportional directional control valve, via which this cylinder chamber can be connected to a pressure supply connection or a return connection. This makes it possible to selectively supply pressurized hydraulic fluid to the cylinder chamber connected to the proportional directional control valve or to extract hydraulic fluid from the cylinder chamber in order to displace the piston in the cylinder body and thereby change the pivot position of the application boom. However, a change in the position of the piston results, in the known control device, in a change of the spring force exerted by the hydraulic accumulators on the piston, that is, it changes the spring rate, so that the application boom is sprung stiffer or softer, depending on which pivot position the application boom assumes.

The object of the present invention is therefore to improve a control device of the type mentioned above in such a way that the spring rate of the application boom can be decoupled from its pivot position.

This object is achieved in a control device of the generic type according to the invention in that the cylinder effective areas can be pressurized with a predetermined pressure, independently of the pivot position of the application boom.

According to the invention, the cylinder effective areas can be pressurized with a predeterminable pressure which is independent of the pivot position of the application boom. The pressure acting on the cylinder effective areas determines the spring rate of the application boom. Since the pressure is independent of the pivot position of the application boom, its spring rate is also independent of the pivot position.

The design according to the invention of the control device makes it possible to specify a spring rate of the application boom by specifying the pressure acting on the cylinder effective areas. The stiffness of the suspension of the application boom can thus be varied by changing the pressure acting on the two cylinder effective areas.

It is advantageous when the control device has a pressure control device. The pressure acting on the cylinder effective areas can be regulated by means of the pressure control device. The pressure control device may, for example, have at least one directional control valve whose switch position can be changed depending on the pressure. The at least one directional control valve can in particular interact with pressure sensors which detect the pressure acting on the cylinder effective areas.

In a preferred embodiment, the control device has a pressure setting device. The pressure acting on the cylinder effective areas can be predetermined and, in particular, limited, by means of the pressure setting device.

The pressure setting device is conveniently controllable, in particular electrically controllable. This provides a structurally simple way to change the pressure acting on the cylinder effective areas and thus the spring rate of the application boom.

In an advantageous embodiment, the pressure setting device has a pressure limiting element whose input can be connected to the pressure supply connection via a throttle element and the valve arrangement and whose outlet is connected to the return connection. The pressure limiting element ensures that the pressure acting on the cylinder effective areas assumes a predetermined or predeterminable value. If this value is exceeded, the pressure limiting element releases a flow connection from the pressure supply connection via the valve arrangement and the throttle element to the return connection and hydraulic fluid can escape.

Preferably, the pressure limiting element is controllable, in particular mechanically or electrically controllable, such that the value can be set, so that when it is exceeded, the flow connection is released to the return connection.

In an advantageous embodiment of the invention, the pressure limiting element has a pressure limiting valve, in particular a mechanically or electrically controllable pressure limiting valve.

In an advantageous embodiment of the invention, at least one of the two cylinder effective areas is connected to the associated hydraulic accumulator via a connecting element having a variable flow cross-section. This makes it possible to change the flow resistance of the flow connection between the cylinder effective area and the hydraulic accumulator associated with this cylinder effective area in a targeted manner. The greater the flow resistance between the cylinder effective area and the hydraulic accumulator, the greater the damping of the movement of the application boom. By providing a connecting element having a variable flow cross-section, the damping of the movement of the application boom can thus be varied.

It can be provided, for example, that the connecting element having a variable flow cross-section has a controllable proportional valve. Preferably, the proportional valve is electrically controllable.

It is particularly convenient when a throttle element is connected in parallel to the proportional valve. With the aid of the throttle element, independent of the switch position of the proportional valve, a flow connection between the cylinder effective area and the associated hydraulic accumulator can be maintained, which provides a permanent pressure equalization and thus prevents abrupt pressure changes and jerky movements of the application boom.

It is advantageous when the valve arrangement has a first switching state in which the two cylinder effective areas are separated from the pressure supply connection and from the return connection, and a second switching state in which one of the two cylinder effective areas is connected to the pressure supply connection and the other cylinder effective area is connected to the return connection, and a third switching state in which both cylinder effective areas are connected to the pressure supply connection. In the first switching state of the valve arrangement, both cylinder effective areas are decoupled from both the pressure supply connection and the return connection. Due to the spring-loaded mounting of the two cylinder effective areas achieved by the use of the hydraulic accumulator, the application boom can be decoupled in this switching state from rolling movements of the carrier. Such rolling movements can occur, for example, when driving through potholes. If the valve arrangement assumes the second switching state, then one of the two cylinder effective areas is connected to the pressure supply connection and the other cylinder effective area is connected to the return connection. This allows a pivot movement of the application boom in a first pivot direction. If the valve arrangement assumes the third switching state, then both cylinder effective areas are connected to the pressure supply connection. However, it can be provided, for example, that one of the cylinder effective areas is connected via a pressure limiting element to the return connection, so that the hydraulic fluid supplied to this cylinder effective area can flow out as soon as the pressure limiting element releases the flow connection to the return connection. This allows a pivot movement of the application boom in the direction opposite the first pivot direction.

In a preferred embodiment of the invention, the valve arrangement has at least one electrically controllable proportional directional control valve.

Conveniently, the at least one electrically controllable proportional directional control valve comprises three switch positions and a pressure connection connected to the pressure supply connection, a tank connection connected to the return connection and two working connections.

It can be provided, for example, that the first cylinder effective area is connected to a first working connection and the second cylinder effective area is connected to a second working connection. In a first switch position of the proportional directional control valve, both working connections can be connected to the tank connection, in a second switch position of the proportional directional control valve, one of the two working connections can be connected to the pressure connection and the other working connection to the tank connection, and in a third switch position of the proportional control valve, both working connections can be connected to the pressure connection.

In an embodiment that is particularly inexpensive to produce, the control device has a single electrically controllable proportional directional control valve, preferably an electrically controllable proportional directional control valve having three switch positions. Such a configuration is particularly advantageous when the hydraulic cylinder arrangement has only a double-acting hydraulic cylinder whose cylinder chambers are connected to the proportional directional control valve.

Alternatively, it can be provided that the valve arrangement has a first and a second electrically controllable proportional directional control valve having preferably three switch positions. Such a configuration is particularly advantageous when the hydraulic cylinder arrangement has two hydraulic cylinders.

It can be provided, for example, that the first cylinder effective area is connectable to the pressure supply connection and the return connection via the first electrically controllable proportional directional control valve and that the second cylinder effective area is connectable to the pressure supply connection and the return connection via the second electrically controllable proportional directional control valve.

In an advantageous embodiment of the invention, the application boom has a first boom arm and a second boom arm, which are rigidly connected to each other and pivotally mounted on the carrier, and the hydraulic cylinder arrangement has a single hydraulic cylinder which is hinged with a first end to the carrier and is hinged with a second end to the application boom, wherein the hydraulic cylinder has a cylinder body whose interior is divided into a first cylinder chamber and a second cylinder chamber by a piston, wherein the side of the piston facing the first cylinder chamber forms the first cylinder effective area and the side of the piston facing the second cylinder chamber forms the second cylinder effective area. Such a configuration can be realized inexpensively. The pivot position of the application boom can be varied as a function of the switching state of the valve arrangement with the aid of the single hydraulic cylinder. In such an embodiment, the valve arrangement preferably has a single, electrically controllable proportional directional control valve having, in particular, three switch positions with two working connections, wherein a first working connection is connected to the first cylinder chamber and a second working connection is connected to the second cylinder chamber of the hydraulic cylinder.

The first cylinder chamber is preferably connected to the above-described pressure control device or pressure setting device, in particular to a pressure limiting element. The pressure limiting element is conveniently controllable, in particular mechanically or electrically controllable.

In an advantageous embodiment of the invention, the application boom has a first boom arm and a second boom arm, which are connected hinged to each other and pivotally mounted on the carrier, and the hydraulic cylinder arrangement has a first and a second hydraulic cylinder, wherein the first hydraulic cylinder is hinged with a first end to the first boom arm and is hinged with a second end to the carrier and has a first cylinder body whose interior is divided into a first cylinder chamber and a second cylinder chamber by a first piston, wherein the side of the first piston facing the first cylinder chamber forms the first cylinder effective area, and wherein the second hydraulic cylinder is hinged with a first end to the second boom arm and is hinged with a second end to the carrier and has a second cylinder body whose interior is divided into a third cylinder chamber and a fourth cylinder chamber by a second piston, wherein the side of the second piston facing the third cylinder chamber forms the second cylinder effective area, and wherein the second cylinder chamber is in flow connection with the fourth cylinder chamber.

If the application boom is to be pivoted in its entirety, thus, for example, the first cylinder chamber can be connected to the pressure supply connection and the third cylinder chamber can be connected to the return connection. This allows pressurized hydraulic fluid to be supplied to the first cylinder chamber while simultaneously discharging hydraulic fluid from the third cylinder chamber. This makes it possible to displace the two pistons in order to pivot the application boom in its entirety in a first pivot direction, wherein hydraulic fluid can simultaneously flow from the second cylinder chamber into the fourth cylinder chamber. For an opposite pivot movement of the application boom in its entirety, the first cylinder chamber can be connected to the return connection and the third cylinder chamber can be connected to the pressure supply connection.

Conveniently, the two boom arms are pivotable relative to each other. If the two boom arms are to be pivoted relative to one another, the first and third cylinder chambers can be connected, for example, to the pressure supply connection and the second and fourth cylinder chambers can be connected to the return connection. For an opposite pivot movement of the two boom arms relative to each other, the first and third cylinder chambers may be connected to the return connection and the second and fourth cylinder chambers may be connected to the pressure supply connection.

It is advantageous when at least one of the cylinder chambers, that is, the first cylinder chamber and/or the second cylinder chamber and/or the third cylinder chamber and/or the fourth cylinder chamber, are connected to above-mentioned pressure control device or pressure setting device, in particular to the pressure limiting element. The pressure limiting element is conveniently controllable, in particular mechanically or electrically controllable.

The invention also relates to an agricultural application device having an application boom pivotally mounted on a carrier, on which application components are arranged, for example, spray nozzles, for applying liquid and/or solid active substances, and having a control device of the aforementioned type. As already mentioned, the spring rate of the application boom can be predetermined by means of the control device, independent of its pivot position, in particular, the spring rate of the application boom can be varied.

The following description of advantageous embodiments of the invention is used in conjunction with the drawings for further explanation. Shown are.

Figure 1:
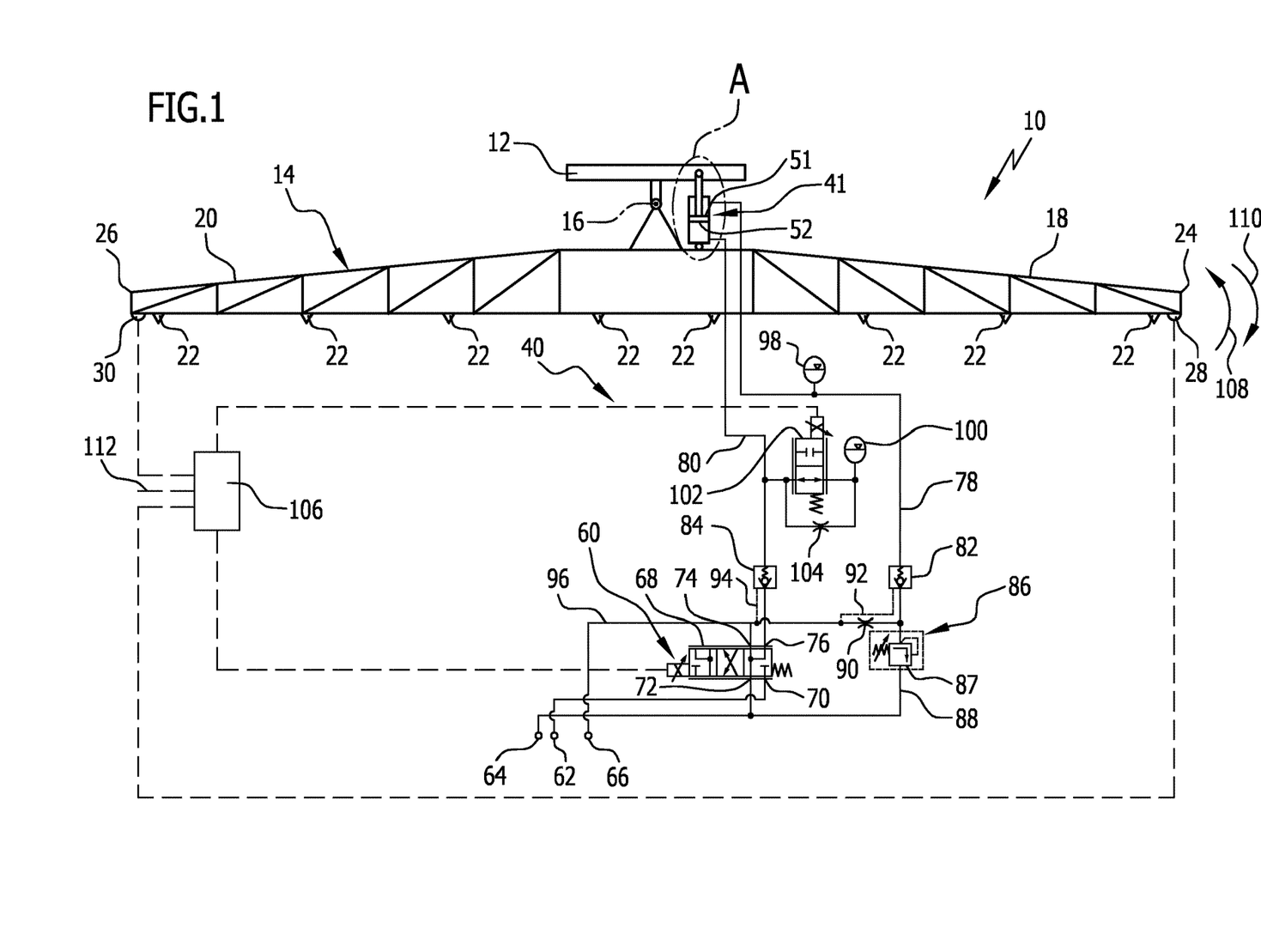
FIG. 1: a schematic representation of a first advantageous embodiment of an agricultural application device according to the invention having a first advantageous embodiment of a control device according to the invention.
Figure 2:
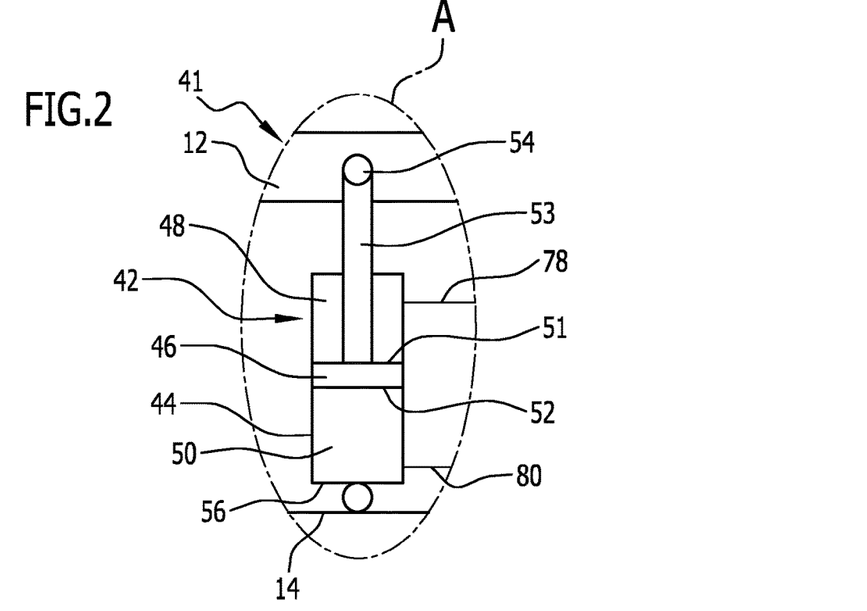
FIG. 2: an enlarged view of detail A of FIG. 1.

A first advantageous embodiment of an agricultural application device according to the invention is shown schematically in FIGS. 1 and 2, which embodiment is generally designated by the reference numeral 10. The application device 10 comprises a carrier 12 which is mounted adjustable and spring-loaded in the vertical direction on a support frame that is known per se and therefore not shown to achieve a better overview in the drawing. The support frame may, for example, be held on a self-propelled carrier vehicle or on a trailer towed by a towing vehicle.

An application boom 14 is pivotally mounted on the carrier 12 about a horizontal pivot axis 16. The application boom 14 has a first boom arm 18 and a second boom arm 20. The two boom arms 18 and 20 are rigidly connected to each other and aligned with each other and carry on their underside a plurality of application components 22, which may be configured, for example, as spray nozzles. With the aid of the application components 22, liquid and/or solid active substances, such as fertilizers or pesticides, are applied to a surface to be treated, in particular on a ground surface or a plant canopy. In addition, the two boom arms 18, 20 each have a sensor 28, 30 at their free ends 24 and 26. The distance between the boom arms 18, 20 and the surface to be treated can be determined with the aid of the sensors 28, 30.

The application device 10 has a first advantageous embodiment of a control device according to the invention, which is generally designated by the reference numeral 40. The application boom 14 can be pivoted about the pivot axis 16 with the aid of the control device 40. The control device 40 has a hydraulic cylinder arrangement 41 having a single hydraulic cylinder 42. The hydraulic cylinder arrangement 41 is shown enlarged in FIG. 2. The hydraulic cylinder 42 comprises a cylinder body 44 in which a piston 46 is displaceably mounted. The piston 46 divides the interior of the cylinder body 44 into a first cylinder chamber 48 and a second cylinder chamber 50. The side of the piston 46 facing the first cylinder chamber 48 forms a first cylinder effective area 51, and the side of the piston 46 facing the second cylinder chamber 50 forms a second cylinder effective area 52. The two cylinder effective areas 51, 52 are mechanically coupled to each other by means of the piston 46 and braced against each other by application of pressurized hydraulic fluid.

A piston rod 53 reaches through the first cylinder chamber 48, which piston rod is fixed to the piston 46 and, with its end protruding from the first cylinder chamber 48, is hinged to the carrier 12 offset to the pivot axis 16. The protruding end 54 of the piston rod 53 forms a first end of the hydraulic cylinder 42. A second end of the hydraulic cylinder 42 is formed by an end face 56 of the cylinder body 44 facing away from the piston rod 53 and is hinged to the application boom 14. The hydraulic cylinder 42 is thus connected articulated to both the carrier 12 and the application boom 14.

The control device 40 also has a valve arrangement 60 and a pressure supply connection 62 and a return connection 64. In addition to the pressure supply connection 62 and the return connection 64, the control device 40 has a control connection 66. A pressure source, which is known per se and therefore not shown in the drawing to achieve a better overview, in the form of a load-sensing pump can be connected to the pressure supply connection 62, wherein the control input of the pressure source can be connected to the control connection 66. A storage tank, which is also not shown in the drawing to achieve a better overview, for hydraulic fluid can be connected to the return connection 64. The control device 40 can be supplied with pressurized hydraulic fluid from the load-sensing pump via the pressure supply connection 62, and hydraulic fluid can be dispensed from the control device 40 to the storage tank via the return connection 64.

The valve arrangement 60 has a first electrically controllable proportional directional control valve 68, which is configured as a 4/3 directional control valve having three switch positions and having a pressure connection 70, a tank connection 72, a first working connection 74 and a second working connection 76.

The pressure connection 70 is connected to the pressure supply connection 62, and the tank connection 72 is connected to the return connection 64. The first working connection 74 is in flow connection with the first cylinder chamber 48 via a first working line 78, and the second working connection 76 is in flow connection with the second cylinder chamber 50 via a second working line 80.

A first hydraulically unlockable check valve 82 is connected in the first working line 78, and a second hydraulically unlockable check valve 84 is connected in the second working line 80.

The control device 40 also comprises a pressure setting device 86, which, in the illustrated embodiment, has a pressure limiting element in the form of an adjustable pressure limiting valve 87. The pressure limiting valve 87 is connected in a pressure limiting line 88, which branches off from the first working line 78 in the region between the first working connection 74 and the first hydraulically unlockable check valve 82 and connects it to the return connection 64. The pressure limiting valve is manually adjustable in the illustrated embodiment. Alternatively, it can be provided, for example, that the pressure limiting valve 87 is electrically controllable and is connected to the electrical control element 106 explained in more detail in the following.

In the region between the first working connection 74 and the first hydraulically unlockable check valve 82, a first throttle element 90 is connected in the first working line 78, and a first valve control line 92 branches off between the first throttle element 90 and the first working connection 74 from the first working line 78 and extends up to the first hydraulically unlockable check valve 82. The first hydraulically unlockable check valve 82 opens in the direction of the first cylinder chamber 48 and can be hydraulically unlocked via the first valve control line 92 for a flow in the opposite direction.

In the region between the first working connection 74 and the first throttle element 90, a second valve control line 94 branches off from the first working line 78 and extends up to the second hydraulically unlockable check valve 84. The second hydraulically unlockable check valve 84 opens in the direction of the second cylinder chamber 50 and can be hydraulically unlocked via the second valve control line 94 for a flow in the opposite direction.

In the region between the first working connection 74 and the first throttle element 90, a pump control line 96 branches off from the first working line 78 and extends from the first working line 78 up to the control connection 66 of the control device 40. The pressure of the hydraulic fluid prevailing at the first working connection 74 can be tapped via the pump control line 96 to control the load-sensing pump, not shown in the drawing, whose outlet can be connected to the pressure supply connection 62.

In the region between the first hydraulically unlockable check valve 82 and the first cylinder chamber 48, a first hydraulic accumulator 98 is connected to the first working line 78, and in the region between the second hydraulically unlockable check valve 84 and the second cylinder chamber 50, a second hydraulic accumulator 100 is connected to the second working line 80. The connection between the second working line 80 and the second hydraulic accumulator 100 is made via a connecting element having variable flow cross-section, which is configured in the illustrated embodiment of the control device 40 as a second electrically controllable proportional directional control valve 102. The second electrically controllable proportional directional control valve 102 is configured as a 2/2 directional control valve having two switch positions and having a valve inlet which is connected to the second working line 80, and having a valve outlet which is connected to the second hydraulic accumulator 100. The flow cross-section and thus also the flow resistance of the connection between the second cylinder effective area 52 and the second hydraulic accumulator 100 are dependent on the position assumed by the second proportional directional control valve. A second throttle element 104 is connected parallel to the second proportional directional control valve 102. As a result, independent of the switch position of the second proportional directional valve 102, a flow connection between the second cylinder effective area 52 and the second hydraulic accumulator 100 is maintained, which provides a permanent pressure equalization and thus prevents abrupt pressure changes and jerky movements of the application boom 14.

The first proportional directional control valve 68, like the second proportional directional control valve 102, is connected to an electrical control element 106, to which the sensors 28 and 30 are also connected. In addition, a communication line 112, for example a CAN bus, is connected to the control element 106, via which the control element 106 can communicate with an external control device. Electrical control signals can be generated for controlling the first proportional directional control valve 68 and the second proportional directional control valve 102 by means of the electrical control element 106.

The valve arrangement 60 has a first switching state, a second switching state and a third switching state. In the first switching state, the first proportional directional control valve 68 assumes a first switch position, in which both the first working connection 74 and the second working connection 76 are connected to the return connection 64. In a second switching state of the valve arrangement 60, the first proportional directional control valve 68 assumes a second switch position, in which the first working connection 74 is connected to the pressure connection 70 and the second working connection 76 is connected to the tank connection 72. In the third switching state of the valve arrangement 60, the first proportional directional control valve 68 assumes a third switch position, in which both the first working connection 74 and the second working connection 76 are connected to the pressure connection 70. The respective switch positions of the first proportional directional control valve 68 are specified by the electrical control element 106.

In the first switching state of the valve arrangement 60, the two hydraulically unlockable check valves 82, 84 assume their blocking position, so that both the first cylinder effective area 51 and the second cylinder effective area 52 are decoupled from the pressure supply connection 62 and the return connection 64. However, the first cylinder effective area 51 is still connected to the first hydraulic accumulator 98, and the second cylinder effective area 52 is still connected to the second hydraulic accumulator 100. The application boom 14 can perform a spring-loaded pendulum movement about the pivot axis 16 in this switching state, wherein the suspension is ensured by the two hydraulic accumulators 98, 100. The flow cross-section and thus also the flow resistance of the connection between the second cylinder effective area 52 and the second hydraulic accumulator 100 can be varied with the aid of the second proportional directional control valve 102. The smaller the flow cross-section, the greater the flow resistance and the greater the damping experienced by the pendulum movement of the application boom 14. By specifying the position of the second proportional directional control valve 102, the damping of the pendulum movement of the application boom 14 can thus be specified.

In the second switching state of the valve arrangement 60, the first working connection 74 is in flow connection with the pressure supply connection 62, and the second working connection 76 is in flow connection with the return connection 64. This has the consequence that the first cylinder chamber 48 can be supplied pressurized hydraulic fluid via the first working line 78. Simultaneously, the second hydraulically unlockable check valve 84 is unlocked, so that the second cylinder chamber 50 is connected to the return connection 64 via the second working line 80 and the second working connection 76 and hydraulic fluid can flow out of the second cylinder chamber 50. The piston 46 is displaced in the direction of the second cylinder chamber 50, so that the length of the hydraulic cylinder 42 is reduced and the application boom 14 is pivoted in a first pivot direction, which is symbolized by the arrow 108 in FIG. 1.

In the third switching state of the valve arrangement 60, the first proportional directional control valve 68 assumes its third switch position, in which both working connections 74, 76 are in flow connection with the pressure supply connection 62. Both cylinder chambers 48, 50 can thus be supplied with pressurized hydraulic fluid. However, since the first cylinder effective area 51 is smaller than the second cylinder effective area 51 due to the piston rod 53 passing through the first cylinder chamber 48 and the pressure in the first cylinder chamber 48 also being limited by the pressure limiting valve 87, the simultaneous pressurization of both cylinder chambers 48, 50 results in a greater force acting on the second cylinder effective area 52 than on the first cylinder effective area 51. This in turn results in a movement of the piston 46 in the direction of the first cylinder chamber 48, so that the second cylinder chamber 50 receives hydraulic fluid and drains hydraulic fluid from the first cylinder chamber 48. As soon as the pressure of the hydraulic fluid prevailing in the first working line 78 exceeds a maximum value predetermined by the pressure limiting valve 87, the pressure limiting valve 87 releases the flow connection from the first working line 78 to the return connection 64. The hydraulic fluid flowing out from the first cylinder chamber 48 can thus be received by the storage tank that is connectable to the return connection. The increase in the volume of the second cylinder chamber 50 while simultaneously reducing the volume of the first cylinder chamber 48 results in the length of the hydraulic cylinder 42 being increased and the application boom 14 is thereby pivoted in the second pivot direction 110 opposing the first pivot direction 108.

The pressure, which is set in the first cylinder chamber 48 and in the second cylinder chamber 50, is predetermined by the pressure limiting valve 87 and determines the stiffness of the suspension of the application boom 14, that is, its spring rate.

By changing the switching state of the valve arrangement 60, the application boom 14 can thus be pivoted into the first pivot direction 108 and into the second pivot direction 110. The spring rate can be adjusted to a predetermined value independently of the pivot position of the application boom 14 by means of the pressure limiting valve 87, and the damping of the pivot movement can be varied by changing the switch position of the second proportional directional control valve 102.

Figure 3:
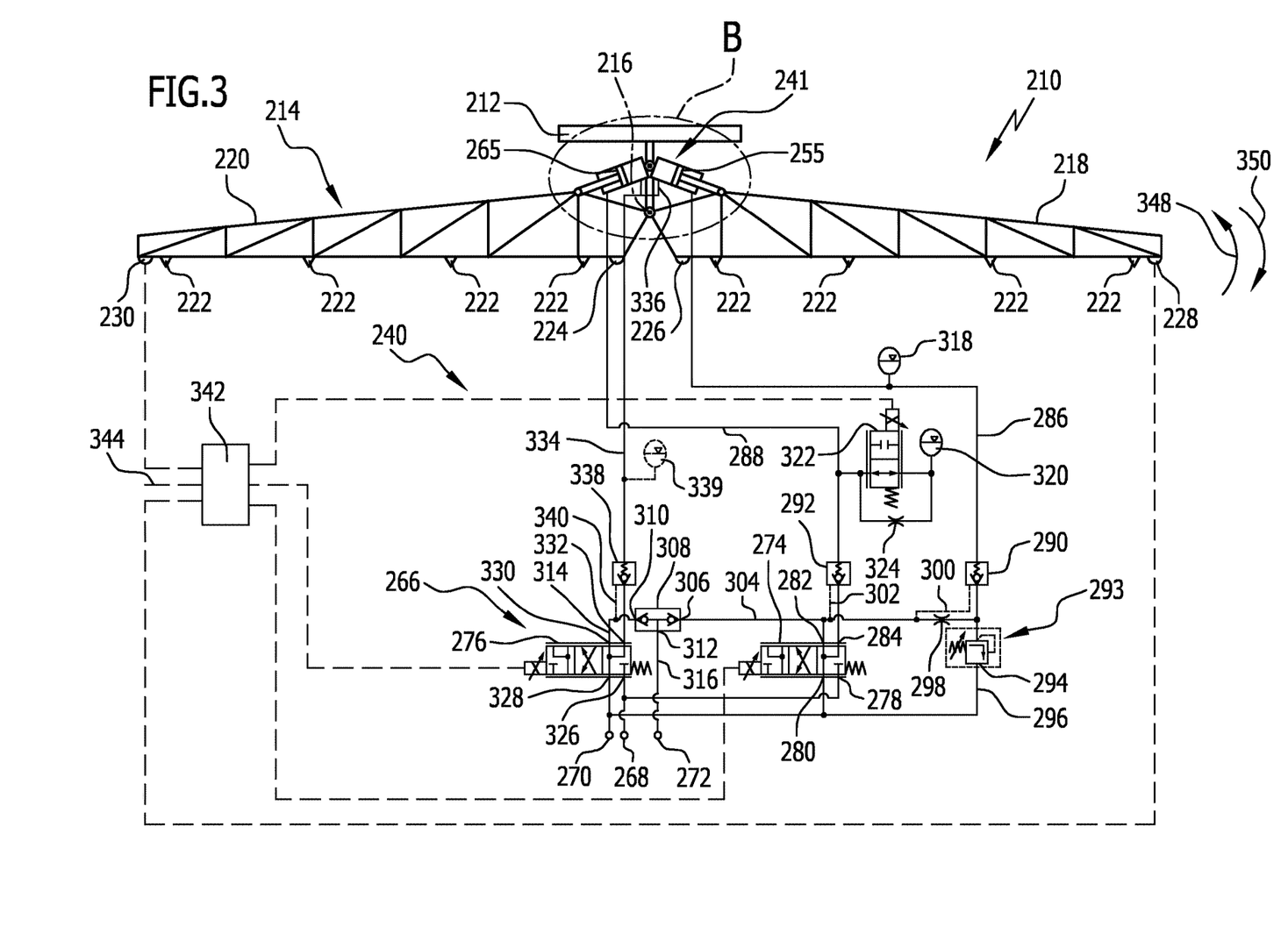
FIG. 3: a schematic representation of a second advantageous embodiment of an agricultural application device according to the invention having a second advantageous embodiment of a control device according to the invention.
Figure 4:
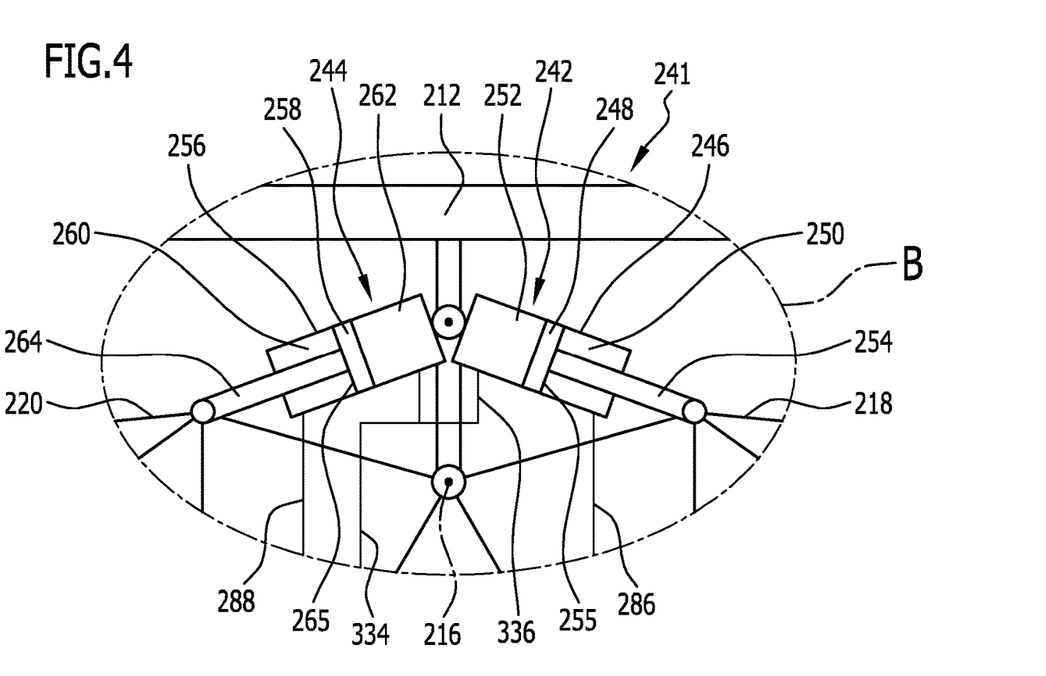
FIG. 4: an enlarged view of detail B of FIG. 3.

A second advantageous embodiment of an agricultural application device according to the invention is shown schematically in FIGS. 3 and 4, which is generally designated by the reference numeral 210. Similar to the application device 10 explained above with reference to FIGS. 1 and 2, the application device 210 has a carrier 212 which is mounted adjustable and spring-loaded in the vertical direction on a support frame (not shown in the drawing).

An application boom 214 is pivotally mounted on the carrier 212 about a pivot axis 216. The application boom 214 has a first boom arm 218 and a second boom arm 220 which can be pivoted about the pivot axis 216. In contrast to the boom arms 18 and 20 of the above-explained application device 10, the boom arms 218 and 220 of the application device 210 are connected hinged to each other. As will be explained in more detail in the following, this gives, on the one hand, the option of pivoting the two boom arms 218, 220 together in a first pivot direction and a second pivot direction opposing the first pivot direction, and, on the other hand, the two boom arms 218, 220 can also be pivoted relative to each another about the pivot axis 216.

Application components 222, for example, spray nozzles, are held on the underside of the boom arms 218, 220. By means of the application components 222, liquid and/or solid active substances, such as pesticides or fertilizers, can be applied to a surface to be treated, for example, on a ground surface or on a plant canopy.

Sensors 224, 226, 228 and 230 are arranged at the ends of the two boom arms 218, 220 facing each other and facing away from each other, with the aid of which the distance of the respective boom arm 218, 220 to the surface to be treated can be determined.

A second advantageous embodiment of a control device according to the invention is used for pivoting the boom arms 218, 220, which is generally designated by the reference numeral 240. The control device 240 has a hydraulic cylinder arrangement 241, shown enlarged in FIG. 4, having a first hydraulic cylinder 242 and a second hydraulic cylinder 244. In addition, the control device 240 has a valve arrangement 266 explained in more detail in the following, and a pressure supply connection 268, a return connection 270 and a control connection 271.

The first hydraulic cylinder 242 comprises a first cylinder body 246, whose interior is divided into a first cylinder chamber 250 and a second cylinder chamber 252 by a first piston 248 displaceably mounted in the first cylinder body 246. A first piston rod 254 reaches through the first cylinder chamber 250, which piston rod is fixed to the first piston 248 and is hinged with its end protruding from the first cylinder chamber 250 to the first boom arm 218. The first cylinder body 246 is hinged to the carrier 212 with its end facing away from the first piston rod 254. The side of the first piston 248 facing the first cylinder chamber 250 forms a first cylinder effective area 255.

The second hydraulic cylinder 244 is configured identically to the first hydraulic cylinder 242. The second hydraulic cylinder 244 has a second cylinder body 256, whose interior is divided into a third cylinder chamber 260 and a fourth cylinder chamber 262 by a second piston 258 displaceably mounted in the second cylinder body 256. A second piston rod 264 reaches through the second cylinder chamber 260, which piston rod is fixed to the second piston 258 and is hinged with its end protruding from the third cylinder chamber 262 to the second boom arm 220. The second cylinder body 256 is hinged to the carrier 212 with its end facing away from the second piston rod 264. The side of the second piston 258 facing the third cylinder chamber 260 forms a second cylinder effective area 265.

As already mentioned, the control device 240 has a valve arrangement 266 and a pressure supply connection 268, a return connection 270 and a control connection 272. A load-sensing pump, which is known per se and therefore not shown in the drawing to achieve a better overview, can be connected to the pressure supply connection 268, wherein the control input of the load-sensing pump can be connected to the control connection 272. A storage tank, which is also known per se and therefore not shown in the drawing, for hydraulic fluid can be connected at the return connection 270. The control device 240 can be supplied with pressurized hydraulic fluid from the load-sensing pump via the pressure supply connection 268, and hydraulic fluid can be dispensed from the control device 240 to the storage tank via the return connection 270.

The valve arrangement 266 has a first electrically controllable proportional directional control valve 274 and a second electrically controllable proportional directional control valve 276. The two directional control valves 274 and 276 are configured identically in the form of 4/3 directional control valves having three switch positions.

The first proportional directional control valve 274 comprises a first pressure connection 278, a first tank connection 280 and a first working connection 282 and a second working connection 284. The first pressure connection 278 is connected to the pressure supply connection 268, and the first tank connection 280 is connected to the return connection 270. The first working connection 282 is in flow connection with the first cylinder chamber 250 via a first working line 286, and the second working connection 284 is in flow connection with the third cylinder chamber 260 via a second working line 288.

A first hydraulically unlockable check valve 290 is connected in the first working line 286, and a second hydraulically unlockable check valve 292 is connected in the second working line 288.

The control device 240 also comprises a pressure setting device 293, which, in the illustrated embodiment, has a pressure limiting element in the form of an adjustable pressure limiting valve 294. The pressure limiting valve 294 is connected in a pressure limiting line 296, which branches off from the first working line 286 in the region between the first working connection 282 and the first hydraulically unlockable check valve 290 and connects it to the return connection 270. The pressure limiting valve 294 is manually adjustable in the illustrated embodiment. Alternatively, it can be provided, for example, that the pressure limiting valve 294 is electrically controllable and is connected to the electrical control element 342 explained in more detail below.

A first throttle element 298 is connected in the first working line 286 in the region between the first working connection 282 and the first unlockable check valve 290. The first hydraulically unlockable check valve 290 opens in the direction of the first cylinder chamber 250 and can be hydraulically unlocked via a first valve control line 300 for a flow in the opposite direction. The first valve control line 300 branches off from the first working line 286 between the first throttle element 298 and the first working connection 282.

The second hydraulically unlockable check valve 292 opens in the direction of the third cylinder chamber 260 and can be hydraulically unlocked via a second valve control line 302 for a flow in the opposite direction. The second valve control line 302 branches off from the first working line 286 between the first throttle element 298 and the first working connection 282.

A first pump control line 304 branches off from the first working line 286 between the first working connection 282 and the first throttle element 298, which control line extends up to a first inlet 306 of a shuttle valve 308. In addition to the first inlet 306, the shuttle valve 308 has a second inlet 310 and an outlet 312. A second pump control line 314 is connected to the second inlet 310, which will be explained in more detail in the following. The outlet 312 of the shuttle valve 308 is in flow connection with the control connection 272 of the control device 240 via an outlet line 316. The first pump control line 304 and the second pump control line 314 can be pressurized in each case with pressurized hydraulic fluid, and the larger of the two pressures can be tapped with the aid of the shuttle valve 308 for controlling the load-sensing pump, not shown in the drawing, whose outlet to the pressure supply connection 268 is connectable.

In the region between the first hydraulically unlockable check valve 290 and the first cylinder chamber 250, a first hydraulic accumulator 318 is connected to the first working line 286, and in the region between the second hydraulically unlockable check valve 292 and the third cylinder chamber 260, a second hydraulic accumulator 320 is connected to the second working line 288. The connection between the second working line 288 and the second hydraulic accumulator 320 is made via a connecting element having variable flow cross-section, which is switched off as a third electrically controllable proportional directional control valve 322 in the illustrated embodiment. The third electrically controllable proportional directional control valve 322 is configured as a 2/2 directional control valve having two switch positions and having a valve inlet which is connected to the second working line 288, and having a valve outlet which is connected to the second hydraulic accumulator 320. The flow cross-section and thus also the flow resistance of the connection between the second cylinder effective area 265 and the second hydraulic accumulator 320 are dependent on the position assumed by the third proportional directional control valve 322. A second throttle element 324 is connected parallel to the third proportional directional control valve 322. With the aid of the second throttle element 324, independent of the switch position of the third proportional directional control valve 322, a flow connection between the second working line 288 and the second hydraulic accumulator 320 can be maintained, which provides a permanent pressure equalization and prevents abrupt pressure changes and jerky movements of the application boom 214.

The second proportional directional control valve 276 has a second pressure connection 326, a second tank connection 328 and a third working connection 330 and a fourth working connection 332. The second pressure connection 326 is connected to the pressure supply connection 268, and the second tank connection 328 is connected to the return connection 270.

The third working connection 330 is in flow connection with the second inlet 310 of the shuttle valve 308 via the second pump control line 314 already mentioned above. The fourth working connection 332 is in flow connection via a third working line 334 to a connecting line 336, which connects the second cylinder chamber 252 to the fourth cylinder chamber 262. The second cylinder chamber 252 is thus in flow connection with the fourth cylinder chamber 262, and this in turn has the consequence that the first cylinder effective area 255 is hydraulically coupled with the second cylinder effective area 265 via the first piston 248, the second cylinder chamber 252, the connecting line 336, the fourth cylinder chamber 262, and the second piston 258. The two cylinder effective areas 255, 265 are braced against each other by pressurizing with pressurized hydraulic fluid.

A third hydraulically unlockable check valve 338 is connected in the third working line 334, which check valve opens in the direction of the connecting line 336 and can be hydraulically unlocked via a third valve control line 340 for a flow in the opposite direction. The third valve control line 340 branches off from the second pump control line 314.

An optional hydraulic accumulator 339, shown in dashed lines in FIG. 3, can be connected to the third working line 334 in the region between the third hydraulically unlockable check valve 338 and the connecting line 336.

The first proportional directional control valve 274, the second proportional directional control valve 276 and the third proportional directional control valve 322 are electrically controllable with the aid of an electrical control element 342. The electrical control element 342 is electrically connected to the sensors 228, 230. In addition, a communication line 344, for example a CAN bus, is connected to the control element 342, via which control line the control element 342 can communicate with an external control device. The control element 342 can also be in signal-conducting connection with further sensors, for example, with pressure sensors, with whose aid the pressure in at least one of the working lines 286, 288, 334 can be detected.

The valve arrangement 266 has a first switching state, in which the first proportional directional control valve 274 and the second proportional directional control valve 276 each assume a first switch position.

In the first switch position of the first proportional directional control valve 274, the first working connection 282 and the second working connection 284 are connected to the return connection 270. As a result, the first unlockable check valve 290 and the second unlockable check valve 292 assume their blocking positions and the first cylinder effective area 255 and the second cylinder effective area 265 are separated from the pressure supply connection 268 and the return connection 270. However, the two cylinder effective areas 255 and 265 are still connected to the respectively associated first or second hydraulic accumulator 318, 320, wherein the flow resistance between the second cylinder effective area 265 and the second hydraulic accumulator 320 can be changed by means of the third proportional directional control valve 322.

The third working connection 330 and the fourth working connection 332 are connected to the return connection 270 in the first switch position of the second proportional directional control valve 276. This results in the third hydraulically unlockable check valve 338 assuming its blocking position and consequently the second cylinder chamber 252 and the fourth cylinder chamber 262 are separated from the pressure supply connection 268 and from the return connection 270.

In the first switching state of the valve arrangement 266, the two boom arms 218, 220 of the application boom 214 execute a common spring-loaded pendulum motion about the pivot axis 216, wherein the suspension is ensured by the two hydraulic accumulators 318, 320 and the damping of the oscillating motion can be varied by changing the flow resistance of the connection between the second cylinder effective area 265 and the second hydraulic accumulator 320 by means of the third proportional directional control valve 322.

In a second switching state of the valve arrangement 266, the first proportional directional control valve 274 assumes a second switch position, whereas the second proportional directional control valve 276 retains its first switch position. In the second switch position of the first proportional directional control valve 274, the first working connection 282 is connected to the pressure supply connection 268, and the second working connection 284 is connected to the return connection 270. This has the consequence that the first cylinder chamber 250 can be supplied with pressurized hydraulic fluid. Simultaneously, the second hydraulically unlockable check valve 292 is unlocked, so that hydraulic fluid can flow out of the third cylinder chamber 260. Since the second cylinder chamber 252 is connected to the fourth cylinder chamber 262 via the communication line 336, hydraulic fluid can flow from the second cylinder chamber 252 to the fourth cylinder chamber 262. The first piston 248 shifts in the direction of the second cylinder chamber 252 so that the length of the first hydraulic cylinder 242 decreases, and simultaneously, the second piston 258 shifts in the direction of the third cylinder chamber, so that the length of the second hydraulic cylinder 244 increases. This results in a joint pivot movement of the two boom arms 218, 220 in a first pivot direction 348.

In a third switching state of the valve arrangement 266, the first proportional directional control valve 274 assumes a third switch position and the second proportional directional control valve 276 maintains its first switch position. In the third switch position of the first proportional directional control valve 274, the first working connection 282 and the second working connection 284 are connected to the pressure supply connection 268. The first cylinder chamber 250 is pressurized with pressurized hydraulic fluid via the first working line 286, and the third cylinder chamber 260 is pressurized with pressurized hydraulic fluid via the second working line 288. As soon as the pressure of the hydraulic fluid prevailing in the first working line 286 exceeds a maximum value predetermined by the pressure limiting valve 294, the pressure limiting valve 294 releases the flow connection from the first working line 286 to the return connection 270. As a result, hydraulic fluid can flow out of the first cylinder chamber 250 and hydraulic fluid can flow into the third cylinder chamber 260, wherein a volume compensation between the fourth cylinder chamber 262 and the second cylinder chamber 256 is ensured via the connecting line 336. The increase in the volume of the third cylinder chamber 260 while simultaneously reducing the volume of the first cylinder chamber 250 results in a common pivot movement of the two boom arms 218, 220 about the pivot axis 216 in a first pivot direction 348 opposite second pivot direction 350.

The valve arrangement 266 of the control device 240 also has a fourth switching state, in which the first proportional directional control valve 274 assumes its third switch position already explained above and the second proportional directional control valve 276 assumes a second switch position. In the second switch position of the second proportional directional control valve 276, the third working connection 330 is connected to the pressure supply connection 268, and the fourth working connection 332 is connected to the return connection 270. As a result, the third hydraulically unlockable check valve 338 can be unlocked and hydraulic fluid can thereby flow out of the second cylinder chamber 252 and out of the fourth cylinder chamber 262, thus reducing their volumes while simultaneously increasing the volumes of the first cylinder chamber 250 and the third cylinder chamber 260. This causes the two boom arms 218, 220 to be pivoted in directions opposite each other about the pivot axis 216, wherein with their free ends they assume an increasing distance to the surface to be treated, that is, the boom arms 218, 220 are pivoted upwards.

The valve arrangement 266 also has a fifth switching state, in which the first proportional directional control valve 274 assumes its second switch position already explained above and the second proportional directional control valve 276 assumes a third switch position. In the third switch position of the second proportional directional control valve, the third working connection 330 and the fourth working connection 332 are connected to the pressure supply connection 268 so that the second cylinder chamber 252 and the fourth cylinder chamber 262 can be supplied with pressurized hydraulic fluid. Since the first proportional directional control valve assumes its second switch position, the first unlockable check valve 290 and the second unlockable check valve are unlocked. Hydraulic fluid can flow out of the third cylinder chamber 260 via the second working line 288. As soon as the pressure of the hydraulic fluid prevailing in the first working line 286 exceeds the maximum value predetermined by the pressure limiting valve 294, the pressure limiting valve 294 releases the flow connection from the first working line 286 to the return connection 270, so that hydraulic fluid can also flow out of the first cylinder chamber 250. The volumes of the first cylinder chamber 250 and the third cylinder chamber 260 decrease, and the volumes of the second cylinder chamber 252 and the fourth cylinder chamber 262 increase. This causes the two boom arms 218, 220 to be pivoted in directions opposite to each other about the pivot axis 216, wherein with their free ends they approach the surface to be treated, that is, the boom arms 218, 220 are pivoted downward.

The two boom arms 218, 220 can thus be pivoted together in the first pivot direction 348 and in the second pivot direction 350 by changing the switching state of the valve arrangement 266. In addition, the boom arms 218, 220 can be pivoted in opposite directions up and down. The spring rate can be set to a predetermined value independent of the pivot position of the boom arms 218, 220 by means of the pressure limiting valve 294, and the damping of the pivot movement can be varied by changing the switch position of the third proportional directional control valve 322. A change in the pivot position of either one of the two boom arms 218, 220 can also be achieved by a superposition of said movements, whereas the other of the two boom arms 218, 220 maintains its pivot position.

Figure 5:
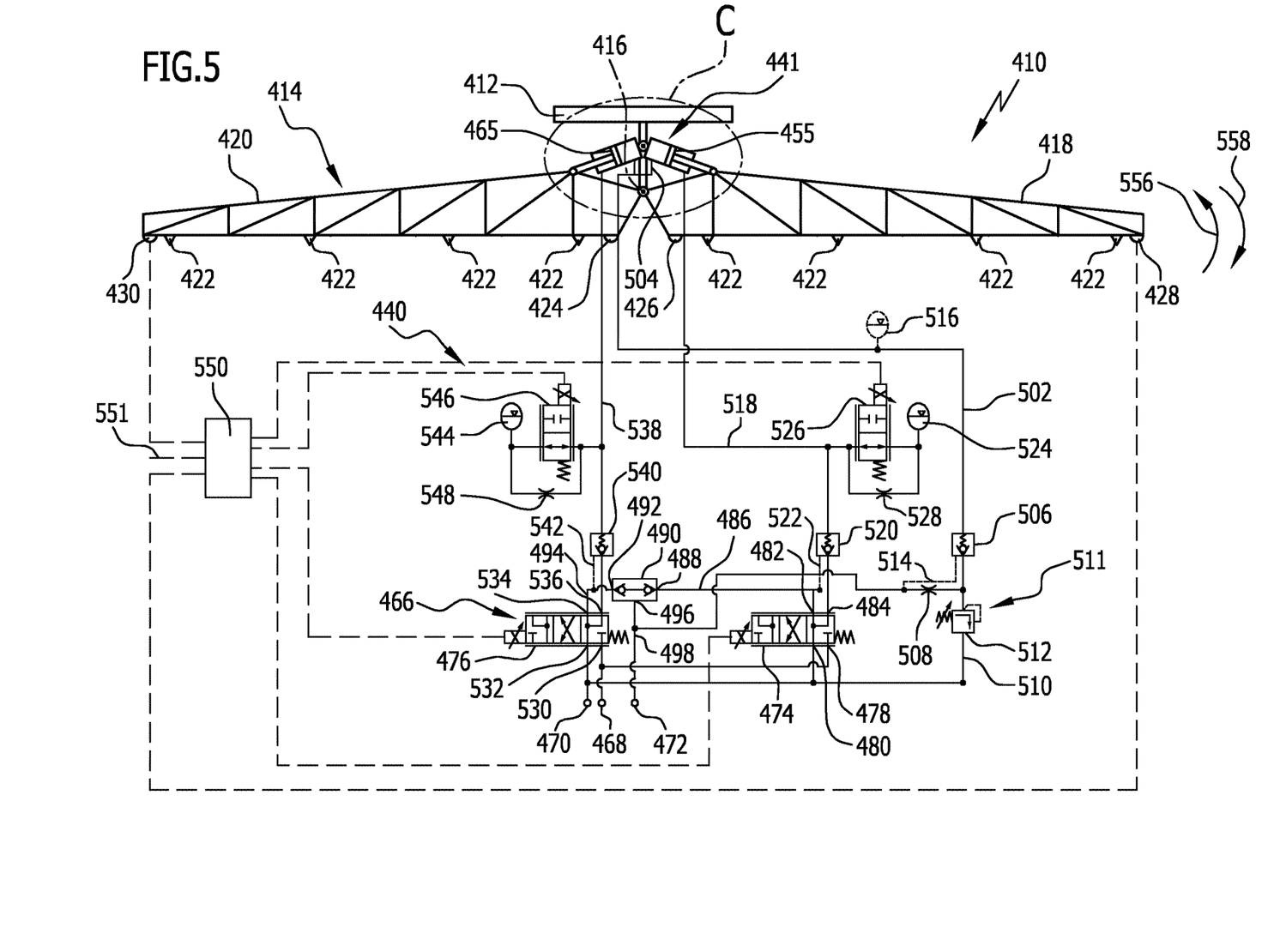
FIG. 5: a schematic representation of a third advantageous embodiment of an agricultural application device according to the invention having a third advantageous embodiment of a control device according to the invention.
Figure 6:
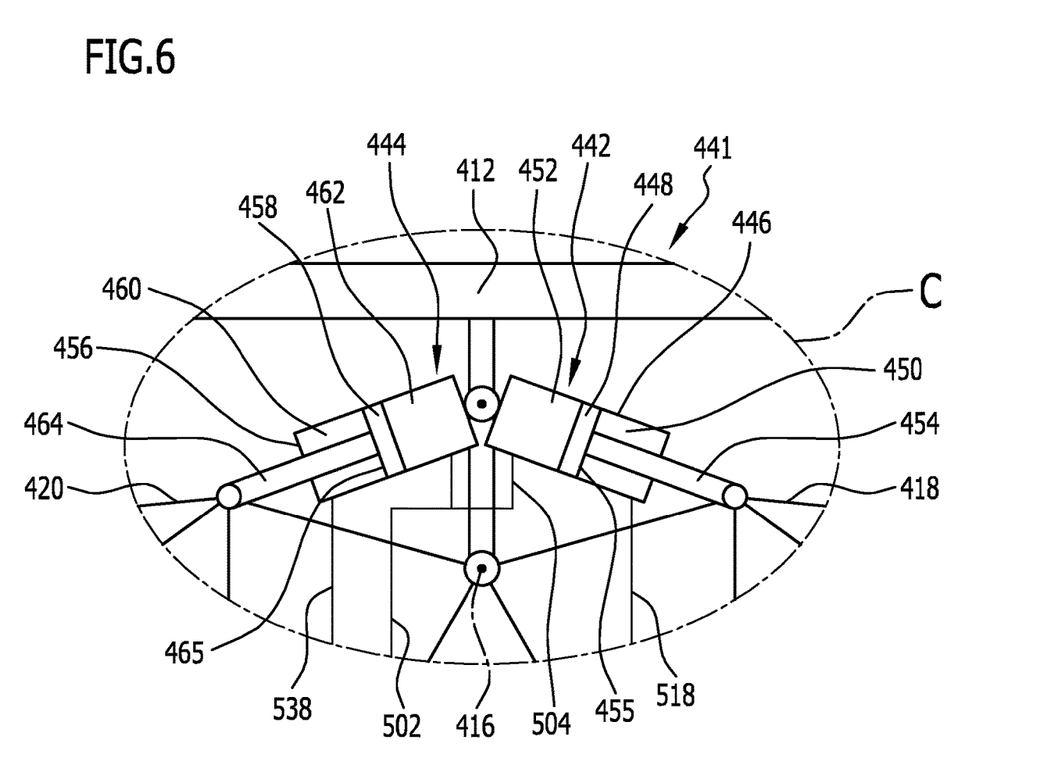
FIG. 6: an enlarged view of detail C of FIG. 5.

A third advantageous embodiment of an agricultural application device according to the invention is shown schematically in FIGS. 5 and 6, which is generally designated by the reference numeral 410. The application device 410, like the application device 210 explained above with reference to FIG. 2, has a carrier 412 which is mounted adjustable and spring-loaded in the vertical direction on a support frame, not shown in the drawing.

An application boom 414 is pivotally mounted on the carrier 412 about a pivot axis 416. The application boom 414 has a first boom arm 418 and a second boom arm 420, which are connected hinged with each other and can be pivoted about the pivot axis 416. In a similar manner as in the embodiment explained above with reference to FIG. 2, the two boom arms 418, 420 can be pivoted together in a first pivot direction and a second pivot direction opposite to the first pivot direction, and they can be pivoted relative to each other about the pivot axis 416.

Application components 422, for example, spray nozzles, are arranged on the underside of the boom arms 418, 420, with whose aid liquid and/or solid active substances, in particular pesticides or fertilizers, are applied to a surface to be treated, for example, on a ground surface or a plant canopy.

Sensors 424, 426, 428 and 430 are arranged at the ends of the two boom arms 418, 420 facing each other and facing away from each other, with the aid of which the distance of the respective boom arm 418, 420 to the surface to be treated can be determined.

A third advantageous embodiment of a control device is used for pivoting the application boom 414 for the application device 410 shown in FIG. 5, which control device is generally designated by the reference numeral 440. In a similar manner as the control device 240 explained above with reference to FIG. 3, the control device 440 shown in FIG. 5 has a hydraulic cylinder arrangement 441 having a first hydraulic cylinder 442 and a second hydraulic cylinder 444. The hydraulic cylinder arrangement 441 is shown enlarged in FIG. 6.

The first hydraulic cylinder 442 has a first cylinder body 446 in which a first piston 448 is displaceably mounted, which divides the first cylinder body 446 into a first cylinder chamber 450 and a second cylinder chamber 452. A first piston rod 454 reaches through the first cylinder chamber 450, which piston rod is fixed to the piston 448 and is hinged with its end protruding from the first cylinder chamber 450 to the first boom arm 418. The first cylinder body 446 is hinged to the carrier 412 with its end face facing away from the first piston rod 454. The side of the first piston 448 facing the first cylinder chamber 450 forms a first cylinder effective area 455.

The second hydraulic cylinder 444 is configured identically to the first hydraulic cylinder 442. The second hydraulic cylinder 444 has a second cylinder body 456, whose interior is divided into a third cylinder chamber 460 and a fourth cylinder chamber 462 by a second piston 458 displaceably mounted in the second cylinder body 456. A second piston rod 464 reaches through the third cylinder chamber 460, which piston rod is fixed to the second piston 458 and is hinged with its end protruding from the third cylinder chamber 460 to the second boom arm 420. The second cylinder body 456 is hinged to the carrier 412 with its end face facing away from the second piston rod 464. The side of the second piston 458 facing the third cylinder chamber 460 forms a second cylinder effective area 465.

The control device 440 has a valve arrangement 466 and a pressure supply connection 468, a return connection 470 and a control connection 472. A load-sensing pump, which is known per se and therefore not shown in the drawing to achieve a better overview, can be connected to the pressure supply connection 468, wherein the control input of the load-sensing pump can be connected to the control connection 472. A storage tank, which is also known per se and therefore not shown in the drawing, for hydraulic fluid can be connected at the return connection 470. The control device 440 can be supplied with pressurized hydraulic fluid from the load-sensing pump via the pressure supply connection 468, and hydraulic fluid can be dispensed from the control device 440 to the storage tank via the return connection 470.

The valve arrangement 466 has a first electrically controllable proportional directional control valve 474 and a second electrically controllable proportional directional control valve 476. The two directional control valves 474 and 476 are configured identically in the form of 4/3 directional control valves having three switch positions.

The first proportional directional control valve 474 comprises a first pressure connection 478, a first tank connection 480 and a first working connection 482 and a second working connection 484. The first pressure connection 478 is in flow connection with the pressure supply connection 468, and the first tank connection 480 is in flow connection with the return connection 470.

The first working connection 482 is connected to a first inlet 488 of a shuttle valve 490 via a first pump control line 486. A second pump control line 494 that is explained in more detail in the following is connected to a second inlet 492 of the shuttle valve 490. The outlet 496 of the shuttle valve 490 is in flow connection with the control connection 472 of the control device 440 via a first outlet line 498. A second outlet line 502 is connected to the first outlet line 498, via which second outlet line a connecting line 504 is connected to the outlet 496. The second cylinder chamber 452 is connected to the fourth cylinder chamber 462 via the connecting line 504. The first pump control line 486 and the second pump control line 494 can be pressurized in each case with pressurized hydraulic fluid, and the larger of the two pressures can be tapped with the aid of the shuttle valve 490 for controlling the load-sensing pump, not shown in the drawing, whose outlet to the pressure supply connection 468 is connectable.

A first hydraulically unlockable check valve 506 is connected in the second outlet line 502, and a first throttle element 508 is connected in the second outlet line 502 in the region between the first unlockable check valve 506 and the outlet 496 of the shuttle valve 490.

In the region between the first throttle element 508 and the first hydraulically unlockable check valve 506, a pressure limiting line 510 branches off from the second outlet line 502, into which a pressure setting device 511 is connected. In the illustrated embodiment, the pressure setting device 511 has a pressure limiting element in the form of an adjustable pressure limiting valve 512. The second outlet line 502 is connected to the return connection 470 via the pressure limiting line 510. The pressure limiting valve 512 is manually adjustable in the illustrated embodiment. Alternatively, for example, an electrically controllable pressure limiting valve can be used, which is connected to the electrical control element 550 explained in the following.

The first hydraulically unlockable check valve 506 opens in the direction of the connecting line 504 and can be unlocked via a first valve control line 514 for a flow in the opposite direction. The first valve control line 514 branches off from the second outlet line 502 between the first throttle element 508 and the outlet 496 of the shuttle valve 490.

An optional hydraulic accumulator 516, shown in dashed lines in FIG. 5, can be connected to the second working line 502 in the region between the first hydraulically unlockable check valve 506 and the connecting line 504.

The second working connection 484 of the first proportional directional control valve 474 is in flow connection with the first cylinder chamber 450 via a first working line 518. A second hydraulically unlockable check valve 520 is connected in the first working line 518, which check valve opens in the direction of the first cylinder chamber 450 and can be unlocked via a second valve control line 522 for a flow in the opposite direction. The second valve control line 522 branches off from the first pump control line 486.

A first hydraulic accumulator 524 is connected to the first working line 518 in the region between the second hydraulically unlockable check valve 520 and the first cylinder chamber 450. The connection between the first working line 518 and the first hydraulic accumulator 524 is made via a connecting element with variable flow cross-section, which is switched off as a third electrically controllable proportional directional control valve 526 in the illustrated embodiment. The third electrically controllable proportional directional control valve 526 is configured as a 2/2 directional control valve having two switch positions and having a valve inlet which is connected to the first working line 518, and having a valve outlet which is connected to the first hydraulic accumulator 524. The flow cross-section and thus also the flow resistance of the connection between the first cylinder effective area 455 and the second hydraulic accumulator 524 are dependent on the position assumed by the third proportional directional control valve 526. A second throttle element 528 is connected parallel to the third proportional directional control valve 526. With the aid of the second throttle element 528, independent of the switch position of the third proportional directional control valve 526, a flow connection between the first working line 518 and the first hydraulic accumulator 524 can be maintained, which provides a permanent pressure equalization and prevents abrupt pressure changes and jerky movements of the application boom 414.

The second proportional directional control valve 476 has a second pressure connection 530, a second tank connection 532 and a third working connection 534 and a fourth working connection 536.

The third working connection 534 is in flow connection with the second inlet 492 of the shuttle valve 490 via the second pump control line 494. The fourth working connection 536 is in flow connection with the third cylinder chamber 460 via a second working line 538. A third hydraulically unlockable check valve 540 is connected in the second working line 538, which check valve opens in the direction of the third cylinder chamber 460 and can be unlocked via a third valve control line 542 for a flow in the opposite direction. The third valve control line 542 branches off from the second pump control line 494.

A second hydraulic accumulator 544 is connected to the second working line 538 in the region between the third hydraulically unlockable check valve 540 and the third cylinder chamber 460. The connection between the second working line 538 and the second hydraulic accumulator 544 is made via a further connecting element with variable flow cross-section, which is switched off as a fourth electrically controllable proportional directional control valve 546 in the illustrated embodiment. The fourth electrically controllable proportional directional control valve 546 is configured as a 2/2 directional control valve having two switch positions in the same way as the previously described third electrically controllable proportional directional control valve 526. A valve inlet of the fourth proportional directional control valve 546 is connected to the second working line 538, and a valve outlet of the fourth proportional directional control valve 546 is connected to the third hydraulic accumulator 544. The flow cross-section and thus also the flow resistance of the connection between the second cylinder effective area 465 and the third hydraulic accumulator 544 are dependent on the position assumed by the fourth proportional directional control valve 546. A third throttle element 548 is connected parallel to the fourth proportional directional control valve 546. With the aid of the third throttle element 548, independent of the switch position of the fourth proportional directional control valve 546, a flow connection between the second working line 538 and the second hydraulic accumulator 544 can be maintained, which provides a permanent pressure equalization and prevents abrupt pressure changes and jerky movements of the application boom 414.

The first proportional directional control valve 474 and the second proportional directional control valve 476 and the third proportional directional control valve 526 and the fourth proportional directional control valve 546 are electrically controllable by means of an electrical control element 550, to which the sensors 428 and 430 are connected. In addition, a communication line 551, for example a CAN bus, is connected to the control element 550, via which control line the control element 550 can communicate with an external control device. The control element 550 can also be in signal-conducting connection with other sensors, for example, with pressure sensors, with whose aid the pressure in the second outlet line 502 and/or the pressure in at least one of the working lines 518, 538 can be detected.

As already mentioned, the valve arrangement 466 comprises the first electrically controllable proportional directional control valve 474 and the second electrically controllable proportional directional control valve 476, which are configured identically in the form of 4/3 directional control valves, each having three switch positions. The valve arrangement 466 has a first switching state in which the first proportional directional control valve 474 and the second proportional directional control valve 476 assume a first switch position. The first working connection 482 and the second working connection 484 are connected to the return connection 470 in the first switch position of the first proportional directional control valve 474, and the third working connection 534 and the fourth working connection 536 are connected to the return connection 470 in the first switch position of the second proportional directional valve 476. This results in all hydraulically unlockable check valves 506, 520 and 540 assuming their blocking position and all cylinder chambers 450, 452, 460 and 462 being separated from both the pressure supply connection 468 and the return connection 470. However, the first and third cylinder chambers 450, 460 are still connected to the respectively associated first and second hydraulic accumulators 524, 544, wherein the flow resistance between the first cylinder chamber 450 and the first hydraulic accumulator 524 can be varied by means of the third proportional directional control valve 526 and wherein the flow resistance between the third cylinder chamber 460 and the second hydraulic accumulator 544 can be varied by means of the fourth proportional directional control valve 546.

In the first switching state of the valve arrangement 466, the two boom arms 418, 420 of the application boom 414 execute a pendulum motion about the pivot axis 416, wherein the pendulum motion is sprung by the use of the hydraulic accumulators 524 and 544 and the damping of the pendulum movement can be changed by varying the switch positions of the third proportional directional valve 526 and the fourth proportional directional control valve 546.

In a second switching state of the valve arrangement 466, the first proportional directional control valve 474 assumes a third switch position, in which the first working connection 482 and the second working connection 484 are connected to the pressure supply connection 468, and the second proportional directional control valve 476 assumes a second switch position, in which the third working connection 534 is connected to the pressure supply connection 468 and the fourth working connection 536 is connected to the return connection 470. This results in the hydraulically unlockable check valves 506, 520 and 540 unlocking and the first cylinder chamber 450 can be supplied hydraulic fluid via the first working line 518 so that the volume of the first cylinder chamber 450 increases, and simultaneously hydraulic fluid can flow from the third cylinder chamber 460 via the second working line 538 to the return connection 470, so that the volume of the third cylinder chamber 460 decreases. This results in a pivot movement of the two boom arms 418, 420 of the application boom 416 about the pivot axis 416 in a first pivot direction, which is illustrated in FIG. 3 by the arrow 556.

In a third switching state of the valve arrangement 466, the first proportional directional control valve 474 assumes its second switch position, in which the first working connection 482 is connected to the pressure supply connection 468 and the second working connection 484 is connected to the return connection 470, and the second proportional directional control valve 476 assumes its third switch position, in which the third working connection 534 and the fourth working connection 536 are in flow connection with the pressure supply connection 468. This results in the second hydraulically unlockable check valve 520 being unlocked so that hydraulic fluid can flow out of the first cylinder chamber 450 and reach the return connection 470, and the third cylinder chamber 460 can simultaneously be supplied with hydraulic fluid via the second working line 538, so that the volume of the third cylinder chamber increases and simultaneously the volume of the first cylinder chamber 450 is reduced. This results in a pivot movement of the two boom arms 418, 420 of the application boom 416 about the pivot axis 416 in a pivot direction opposite the first pivot direction, which is illustrated in FIG. 3 by the arrow 558.

In a fourth switching state of the valve arrangement 466, both the first proportional directional control valve 474 and the second proportional directional control valve 476 can assume their third switch position, so that hydraulic fluid can be supplied to both the first cylinder chamber 450 and the third cylinder chamber 460. As soon as the pressure of the hydraulic fluid prevailing in the second outlet line 502 exceeds a maximum value predetermined by the pressure limiting valve 512, the pressure limiting valve 512 releases the flow connection to the return connection 470, so that hydraulic fluid can flow out of the second cylinder chamber 452 and the fourth cylinder chamber 462. This results in the two boom arms 418, 420 being able to execute pivot movements opposite to each other, wherein, with their free ends, they assume an increasing distance to the surface to be treated, that is, the boom arms 418, 420 are pivoted upwards.

In order to achieve an oppositely directed pivot movement of the two boom arms 418, 420, the valve arrangement 466 can assume a fifth switching state, in which the first proportional directional control valve 474 and the second proportional directional control valve 476 each assume their second switch position, so that the hydraulically unlockable check valves 506, 520 and 540 are unlocked. This this results in hydraulic fluid being able to flow out of the first cylinder chamber 450 and the third cylinder chamber 460, and hydraulic fluid can be supplied to the second cylinder chamber 452 and the fourth cylinder chamber 462 via the first throttle element 508 and the second outlet line 502, wherein the pressure limiting valve 512 maintains constant pressure. This results in the two boom arms 418, 420 being able to execute pivot movements opposite to each other, wherein, with their free ends, they approach the surface to be treated, that is, the boom arms 418, 420 are pivoted downwards.

The two boom arms 418, 420 can thus be pivoted into the first pivot direction 556 and into the second pivot direction 558 by means of the control device 440. In addition, the boom arms 418, 420 can be pivoted in opposite directions up and down. The spring rate can thereby be adjusted to a predetermined value independently of the pivot position of the boom arms 418, 420 by means of the pressure limiting valve 512, and the damping of the pivot movement can be varied by changing the switch position of the third proportional directional valve 526 and the fourth proportional directional control valve 546. A change in the pivot position of either one of the two boom arms 418, 420 can also be achieved by a superposition of said movements, whereas the other of the two boom arms 418, 420 maintains its pivot position.

The invention claimed is:

1. A control device for an agricultural application device, which has an application boom pivotally mounted on a carrier, on which application components are arranged for applying liquid and/or solid active substances, wherein the control device has a pressure supply connection for supplying pressurized hydraulic fluid and a return connection for dispensing hydraulic fluid to a storage tank, and wherein the control device has a controllable valve arrangement and a hydraulic cylinder arrangement, which has a first cylinder effective area, connected to the valve arrangement and a second cylinder effective area, wherein the two cylinder effective areas can be pressurized and each are connected to a hydraulic accumulator, and wherein the pivot position of the application boom can be varied by changing the switching state of the valve arrangement, and wherein the cylinder effective areas are pressurized with a predeterminable pressure independently of the pivot position of the application boom.

2. The control device according to claim 1, wherein the control device has a pressure control device.

3. The control device according to claim 1, wherein the control device has a pressure setting device.

4. The control device according to claim 3, wherein the pressure setting device has a pressure limiting element which is connected to the return connection.

5. The control device according to claim 4, wherein the pressure limiting element is controllable.

6. The control device according to claim 1, wherein at least one cylinder effective area is connected to the associated hydraulic accumulator via a connecting element having variable flow cross-section.

7. The control device according to claim 6, wherein the connecting element has a controllable proportional directional control valve.

8. The control device according to claim 6, wherein a throttle element is connected in parallel to the connecting element.

9. The control device according to claim 1, wherein the valve arrangement has a first switching state, in which the two cylinder effective areas are separated from the pressure supply connection and the return connection, and a second switching state in which one of the two cylinder effective areas is connected to the pressure supply connection and the other cylinder effective area is connected to the return connection, and a third switching state in which both cylinder effective areas are connected to the pressure supply connection.

10. The control device according to claim 1, wherein the valve arrangement has at least one electrically controllable proportional directional control valve.

11. The control device according to claim 10, wherein the at least one electrically controllable proportional directional control valve has three switch positions and a pressure connection connected to the pressure supply connection, a tank connection connected to the return connection and two working connections.

12. The control device according to claim 10, wherein the valve arrangement has a single electrically controllable proportional directional control valve.

13. The control device according to claim 10, wherein the valve arrangement has a first and a second electrically controllable proportional directional control valve.

14. The control device according to claim 13, wherein the first cylinder effective area is connectable to the pressure supply connection and the return connection via the first electrically controllable proportional valve and the second cylinder effective area is connectable to the pressure supply connection and the return connection via the second electrically controllable proportional valve.

15. The control device according to claim 1, wherein the application boom has a first boom arm and a second boom arm which are rigidly connected to each other and pivotally mounted on a carrier, and that the hydraulic cylinder arrangement has a single hydraulic cylinder which is hinged with a first end to the carrier and is hinged with a second end to the application boom, wherein the hydraulic cylinder has a cylinder body whose interior is divided into a first cylinder chamber and a second cylinder chamber by a piston, wherein the surface of the piston facing the first cylinder chamber forms the first cylinder effective area and wherein the surface of the piston facing the second cylinder chamber forms the second cylinder effective area.

16. The control device according to claim 15, wherein that the first cylinder chamber is connected to a pressure control device or a pressure setting device.

17. The control device according to claim 1, wherein the application boom has a first boom arm and a second boom arm, which are connected hinged to each other and are pivotally mounted to a carrier, and that the hydraulic cylinder arrangement has a first hydraulic cylinder and a second hydraulic cylinder, wherein the first hydraulic cylinder is hinged with a first end to the first boom arm and is hinged with a second end to the carrier and has a first cylinder body, whose interior is divided into a first cylinder chamber and a second cylinder chamber by a first piston, wherein the side of the first piston facing the first cylinder chamber forms the first cylinder effective area, and wherein the second hydraulic cylinder is connected hinged with a first end to the second boom arm and is hinged with a second end to the carrier and has a second cylinder body, whose interior is divided into a third cylinder chamber and a fourth cylinder chamber by a second piston, wherein the side of the second piston facing the third cylinder chamber forms the second cylinder effective area, and wherein the second cylinder chamber is in flow connection with the fourth cylinder chamber.

18. The control device according to claim 17, wherein at least one of the cylinder chambers is connected to a pressure control device or a pressure setting device.

19. The control device according to claim 17, wherein the two boom arms are pivotable relative to each other.

20. An agricultural application device having an application boom pivotally mounted on a carrier, on which application components are arranged for the application of liquid and/or solid active substances, and having a control device according to claim 1.

* * * * *